United States Patent
Gates et al.

(10) Patent No.: US 7,603,387 B2
(45) Date of Patent: Oct. 13, 2009

(54) TECHNIQUES TO MANAGE MEDIA FILES

(75) Inventors: Matthijs A. Gates, Wellesley, MA (US);
Kenneth Reneris, Redmond, WA (US);
Dale Sather, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 186 days.

(21) Appl. No.: 11/454,686

(22) Filed: Jun. 16, 2006

(65) Prior Publication Data

US 2007/0294324 A1 Dec. 20, 2007

(51) Int. Cl.
*G06F 17/30* (2006.01)
(52) U.S. Cl. .............................. 707/200; 707/3; 707/205
(58) Field of Classification Search .................... 707/3, 707/200, 205
See application file for complete search history.

(56) References Cited

U.S. PATENT DOCUMENTS

| | | | |
|---|---|---|---|
| 5,537,592 A | 7/1996 | King et al. | |
| 5,634,050 A * | 5/1997 | Krueger et al. | 707/200 |
| 5,655,117 A | 8/1997 | Goldberg et al. | |
| 5,815,703 A | 9/1998 | Copeland et al. | |
| 5,819,292 A | 10/1998 | Hitz et al. | |
| 5,940,838 A * | 8/1999 | Schmuck et al. | 707/200 |
| 5,987,477 A * | 11/1999 | Schmuck et al. | 707/201 |
| 6,128,713 A | 10/2000 | Eisler et al. | |
| 6,205,457 B1 * | 3/2001 | Hurwitz | 707/103 R |
| 6,208,999 B1 | 3/2001 | Spilo et al. | |
| 6,269,254 B1 | 7/2001 | Mathis | |
| 6,324,581 B1 | 11/2001 | Xu et al. | |
| 6,499,039 B1 * | 12/2002 | Venkatesh et al. | 707/204 |
| 6,523,046 B2 | 2/2003 | Liu et al. | |
| 6,718,445 B1 | 4/2004 | Lewis et al. | |
| 6,738,875 B1 | 5/2004 | Wang et al. | |
| 6,751,623 B1 | 6/2004 | Basso et al. | |
| 6,886,033 B1 | 4/2005 | Brush et al. | |
| 6,928,444 B2 | 8/2005 | Richard | |
| 6,983,467 B2 | 1/2006 | Engstrom et al. | |
| 7,007,046 B2 | 2/2006 | Manley et al. | |
| 7,051,064 B1 * | 5/2006 | Yamagishi et al. | 709/200 |
| 7,392,481 B2 | 6/2008 | Gewickey et al. | |
| 2002/0059623 A1 * | 5/2002 | Rodriguez et al. | 725/91 |
| 2002/0136406 A1 * | 9/2002 | Fitzhardinge et al. | 380/210 |
| 2002/0162047 A1 * | 10/2002 | Peters et al. | 714/5 |
| 2003/0172196 A1 | 9/2003 | Hejlsberg et al. | |
| 2003/0212712 A1 * | 11/2003 | Gu et al. | 707/200 |

(Continued)

OTHER PUBLICATIONS

Muthitacharoen, Athicha, et al., "Ivy: A Read/Write Peer-to-Peer File System",http://delivery.acm.org/10.1145/850000/844132/p31-muthitacharoen.pdf? key1=844132&key2=3764353411 &coll=ACM&dl=ACM&CFID=68291885 &CFTOKEN=17247228.

(Continued)

*Primary Examiner*—don wong
*Assistant Examiner*—Kim T Nguyen

(57) ABSTRACT

Techniques to manage media files may be described. An apparatus may comprise a media processing sub-system having a processor, a memory, and a communications interface. The memory may store a media file manager for execution by the processor. The communications interface may receive multiple media streams of media information. The media file manager may store the multiple media streams in a single file using a hierarchy of name-value pairs. Other embodiments are described and claimed.

17 Claims, 7 Drawing Sheets

U.S. PATENT DOCUMENTS

| | | | |
|---|---|---|---|
| 2004/0003008 A1* | 1/2004 | Wasilewski et al. | 707/200 |
| 2004/0028042 A1 | 2/2004 | Srinivasan et al. | |
| 2004/0111439 A1* | 6/2004 | Richardson et al. | 707/200 |
| 2004/0153479 A1* | 8/2004 | Mikesell et al. | 707/200 |
| 2004/0177371 A1 | 9/2004 | Caspi et al. | |
| 2004/0213103 A1 | 10/2004 | Wu et al. | |
| 2005/0091287 A1* | 4/2005 | Sedlar | 707/200 |
| 2005/0108240 A1 | 5/2005 | Bolosky et al. | |
| 2005/0114338 A1 | 5/2005 | Borthakur et al. | |
| 2005/0144501 A1 | 6/2005 | Kim et al. | |
| 2005/0262325 A1 | 11/2005 | Shmueli et al. | |
| 2006/0015482 A1* | 1/2006 | Beyer et al. | 707/3 |
| 2006/0031889 A1 | 2/2006 | Bennett et al. | |
| 2006/0041679 A1 | 2/2006 | Feig | |
| 2006/0064536 A1* | 3/2006 | Tinker et al. | 711/100 |
| 2007/0005616 A1* | 1/2007 | Hay et al. | 707/100 |
| 2007/0185881 A1 | 8/2007 | Vienneau et al. | |
| 2008/0040746 A1* | 2/2008 | Shae et al. | 725/44 |
| 2008/0049621 A1* | 2/2008 | McGuire et al. | 370/236.2 |
| 2008/0086751 A1* | 4/2008 | Horn et al. | 725/87 |

OTHER PUBLICATIONS

Rosenblum, Mendel, et al., "The Design and Implementation of a Log-Structured File System", ACM Transcations on Computer Systems, 1, Feb. 1992, pp. 26-52, vol. 10, http://delivery.acm.org/10.1145/150000/146943/p26-rosenblum.pdf?key1=146943&key2=1866353411&coll=ACM&dl=ACM&CFID=68291885&CFTOKEN=17247228.

Prabhakaran, Vijayan, et al., "IRON File Systems", http://delivery.acm.org/10.1145/1100000/1095830/p206-prabhakaran.pdf?key1=1095830&key2=2455063411&coll=ACM&dl=ACM&CFID=72452264&CFTOKEN=30793760.

Skarra, Andrea, et al., "A File System Interface for Concurrent Access", http://delivery.acm.org/10.1145/510000/504425/p128-skarra.pdf?key1=504425&key2=8295063411&coll=ACM&dl=ACM&CFID=72452264&CFTOKEN=30793760.

International Search Report PCT/US2007/011771, dated Nov. 6, 2007, pp. 1-8.

Becina, Ross, et al., "PortAudio—an Open Source Cross Platform Audio API", http://www.audiomulch.com/~rossb/articles/portaudio_icmc2001.pdf.

Childs, Stephen, "Filing system interfaces to support distributed multimedia applications", http://delivery.acm.org/10.1145/320000/319220/p162-childs.pdf?key1=3199220&key2=3903643411&coll=GUIDE&d!=GUIDE&CFID=68241410&CFTOKEN=49794354.

Loganthan, Vignesh, "Flexible and Scalable Movie Architecture for DSP based DCM/DM Systems", http://www.techonline.com/community/tech_group/38783.

* cited by examiner

TECHNIQUES TO MANAGE MEDIA FILES

CROSS REFERENCE TO RELATED APPLICATION

This application is related to U.S. patent application Ser. No 11/454,409 titled "Application Program Interface To Manage Media Files," and filed on Jun. 16, 2006, the entirety of which is hereby incorporated by reference.

BACKGROUND

Media devices such as a personal video recorder or digital video recorder may be used to store and reproduce digital media content. Examples of digital media content may include television programs, movies, home videos, songs, images, pictures, and so forth. The digital media content may be received from various media sources, such as a cable provider, a satellite provider, a digital versatile disk (DVD) player, a compact disk (CD) player, a digital video home system, a media content provider over an Internet connection, computer files, and so forth. As a result, a media device may need to store an ever-increasing volume of media content from different media sources using multiple files and file types. This may significantly increase file management operations, file structure complexity, and associated costs. Consequently, improved file management techniques may be needed to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to media systems. Some embodiments may be directed to file management techniques for media systems in particular. In one embodiment, for example, a media processing system or subsystem may include a processor, a memory, and a communications interface. The memory may be used to store a media file manager for execution by the processor. The media file manager may be used to implement a file allocation scheme for allocating space in a virtual file for various use scenarios, such as storing multiple media streams and/or media files into a single virtual file.

In operation, the media processing system may receive multiple media streams of media information from various media sources over one or more communications interfaces. The media file manager may store the multiple media streams in physical memory with a single virtual file using a hierarchy of name-value pairs. The single virtual file may have a logical file format that is different from the physical file format used to store the virtual file. For example, the physical file format may store portions of the virtual file using non-contiguous and/or non-sequential portions of physical memory. In this manner, multiple media streams or media files may be stored using a single virtual file, thereby decreasing file complexity and file management operations. Other embodiments are described and claimed.

DETAILED DESCRIPTION

Various embodiments may be directed to a file allocation scheme that may be used to store, retrieve, or otherwise manage media content using any form of machine-readable or computer-readable media, such as on-disk storage, for example. The file allocation scheme may be used to store various types of media content received from various media sources into a single uniform file structure comprising a single virtual file. In some cases, the virtual file may have a logical file structure that is different from the physical file structure used to actually store the media content, thereby releasing the virtual file from physical constraints and requirements. The file allocation scheme is particularly well-suited for PVR and multimedia applications, given the relatively larger volumes of media content associated with television programs and movies, for example. The file allocation scheme, however, is very flexible and extensible and is not necessarily bound to PVR or multimedia applications. The file allocation scheme may be used as an on-disk storage container for many applications and use scenarios. Because it is not tightly integrated with any one given type of application and therefore very extensible, the file allocation scheme may be applicable to any form of current and future applications having to manage larger volumes of data.

Figure 1:
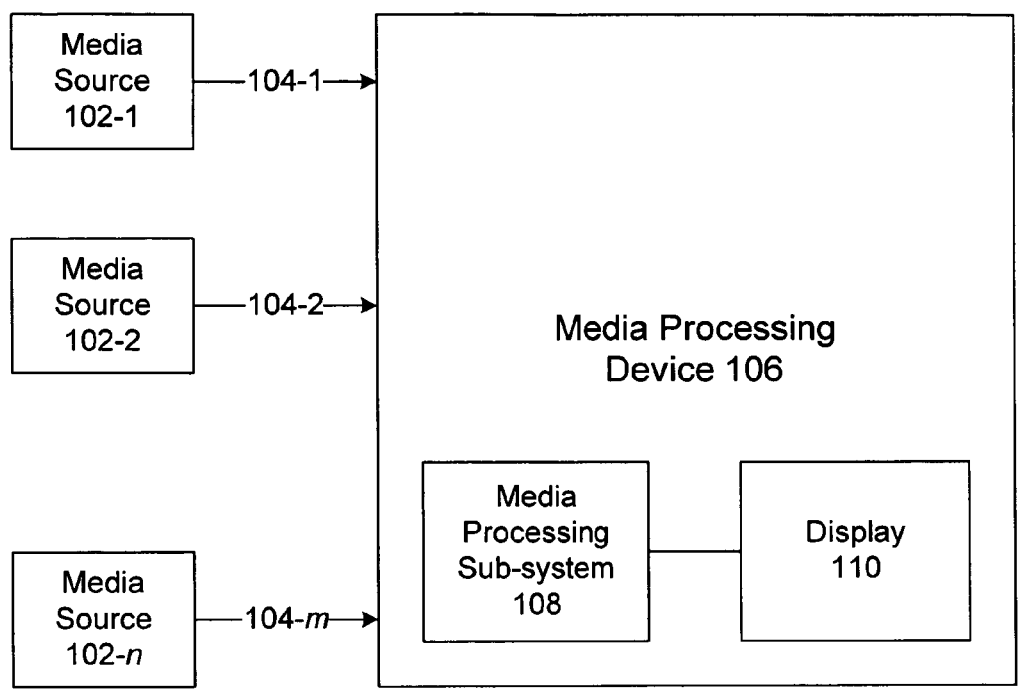
FIG. 1 illustrates an exemplary embodiment of a media system.

FIG. 1 illustrates a block diagram for a media system 100. Media system 100 may represent a general system architecture suitable for implementing various embodiments. Media system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although media system 100 as shown in FIG. 1 has a limited number of elements in a certain topology, it may be appreciated that media system 100 may include more or less elements in alternate topologies as desired for a given implementation. The embodiments are not limited in this context.

In various embodiments, media system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a device to process the media information in a predetermined manner, and so forth.

In various embodiments, media system 100 may include media sources 102-1-n. Media sources 102-1-n may comprise any physical or logical entity capable of sourcing or delivering media information (e.g., digital video signals, audio signals, and so forth) and/or control information to media processing device 106. Examples of media sources 102-1-n may include a DVD device, a VHS device, a digital VHS device, a personal video recorder (PVR), a digital video recorder (DVR), a computer, a gaming console, a CD player, a digital camera, a digital camcorder, and so forth. Other examples of media sources 102-1-n may include media distribution systems to provide broadcast or streaming analog or digital media information to media processing device 106. Examples of media distribution systems may include, for example, over the air (OTA) broadcast systems, terrestrial cable systems (CATV), satellite broadcast systems, and so forth. Media sources 102-1-n may be internal or external to media processing device 106 as desired for a given implementation.

In various embodiments, media system 100 may comprise a media processing device 106 to connect to one or more media sources 102-1-n over one or more communications media 104-1-m. Media processing device 106 may comprise any logical or physical entity that is arranged to process media information received from media sources 102-1-n. In various embodiments, media processing device 106 may comprise, or be implemented as, a computer, a set top box (STB), a media server, a desktop computer, a personal computer (PC), a laptop computer, a handheld computer, a home entertainment system, a home theater system, and so forth.

In various embodiments, media processing device 106 may include a media processing sub-system 108. Media processing sub-system 108 may comprise a processor, memory, and application hardware and/or software arranged to process media information received from media sources 102-1-n. For example, media processing sub-system 108 may be arranged to perform various media management operations, such as receiving media information, storing media information, recording media information, playing media information, performing trick mode operations for media information, performing seek operations for media information, and so forth. Media processing sub-system 108 may output processed media information to a display 110. Display 110 may be any display capable of displaying media information received from media sources 102-1-n.

Figure 2:
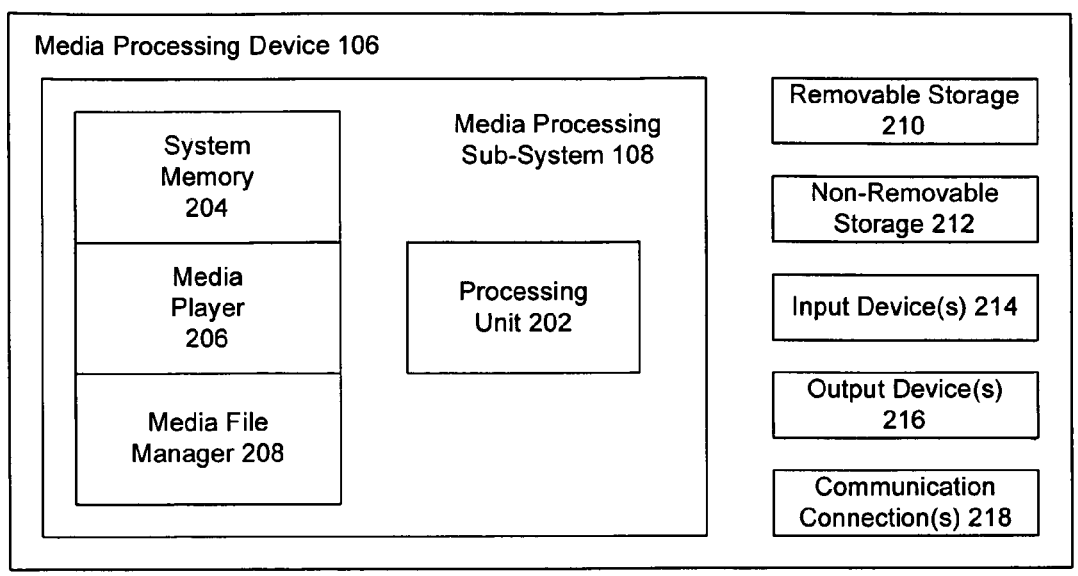
FIG. 2 illustrates an exemplary embodiment of a media processing device.

FIG. 2 illustrates a more detailed block diagram of media processing device 106. In its most basic configuration, media processing device 106 typically includes at least one processing unit 202 and memory 204. Processing unit 202 may be any type of processor capable of executing software, such as a general-purpose processor, a dedicated processor, a media processor, a controller, a microcontroller, an embedded processor, a digital signal processor (DSP), and so forth. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 1, memory 204 may store various software programs, such as one or more media players 206, a media file manager 208, and accompanying data.

Media processing device 106 may also have additional features and/or functionality beyond configuration 106. For example, media processing device 106 may include removable storage 210 and non-removable storage 212, which may also comprise various types of machine-readable or computer-readable media as previously described. Media processing device 106 may also have one or more input devices 214 such as a keyboard, mouse, pen, voice input device, touch input device, and so forth. One or more output devices 216 such as a display (e.g., display 110), speakers, printer, and so forth may also be included in media processing device 106 as well.

Media processing device 106 may further include one or more communications connections 218 that allow media processing device 106 to communicate with other devices. Communications connections 218 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

In general operation, media processing device 106 may receive and store various types of media information from one or more media sources 102-1-n via communications connections 218. Media processing device 106 may store the media information using storage 210, 212, for example. Media file manager 208 may store media information from multiple media streams in physical memory with a single virtual file using a hierarchy of name-value pairs. The single virtual file may have a logical file format that is different from the physical file format used to store the virtual file. For example, the physical file format may store portions of the virtual file using non-contiguous portions of memory from storage 210, 212.

In other words, the logical file structure is disconnected from the physical file structure. In this manner, media file manager 208 may coalesce multiple media files into a single virtual file, thereby decreasing file complexity and file management operations. Media processing device 106 in general, and media file manager 208 in particular, may be further described with reference to FIGS. 3-7 and accompanying examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
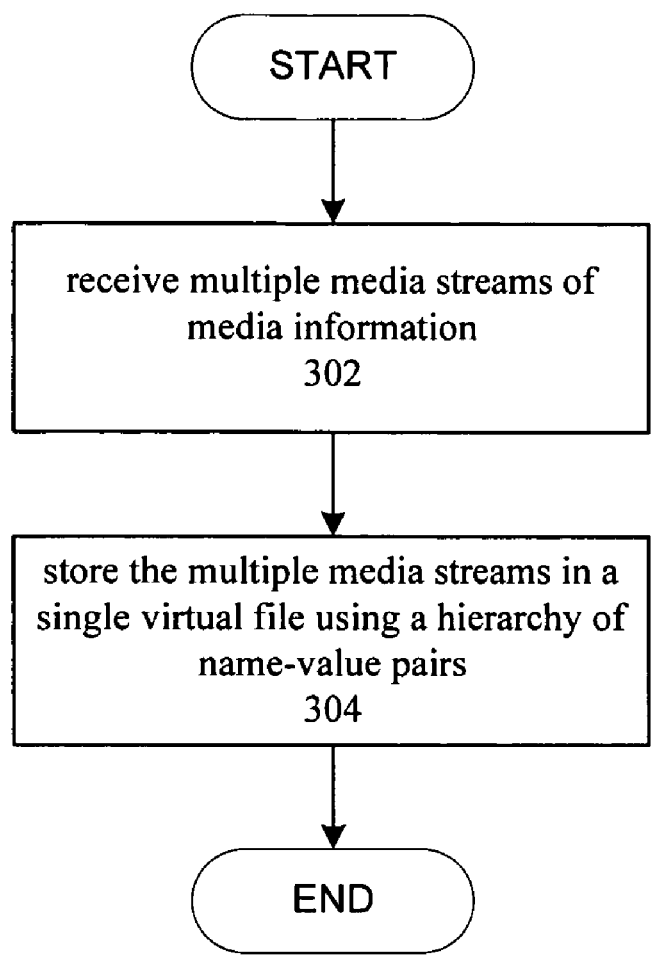
FIG. 3 illustrates an exemplary embodiment of a logic flow.

FIG. 3 illustrates one embodiment of a logic flow 300. Logic flow 300 may be representative of the operations executed by one or more embodiments described herein, such as media system 100, media processing device 106, and/or media processing sub-system 108. As shown in FIG. 3, multiple media streams of media information may be received at block 302. The multiple media streams may be stored in a single virtual file using a hierarchy of name-value pairs (NVPs) at block 304. The embodiments are not limited in this context.

Media file manager 208 of media processing sub-system 108 may be arranged to implement a file allocation scheme for allocating space within a virtual file, such as a virtual media file. The virtual file may comprise, for example, multiple NVPs in one or more containers. A NVP may represent a specific binding between a name and a binary value. One specific type of container may be referred to as a root container. A root container may comprise the highest-level container in a given file.

A NVP may comprise an NVP name and an NVP value. The NVP name may comprise a string having information such as a globally unique identifier (GUID), file name, text name, or some other unique file identifier. The NVP value may comprise several types of values, including a resident value, a short value, or a long value. The different types of NVP values provide distinctions that have performance and efficiency implications with regard to value size. Resident values are stored in-band, adjacent to corresponding NVP names. Short values are stored using a page table technique that implements a virtual file comprising multiple short pages. Short pages may refer to the shorter of two allocation units in a file of a defined length. A page table may comprise an array of long pages or short pages implemented using a tree of fixed-length arrays of page references, referred to as table pages as contained in short pages. Long values are stored using the same or similar page table technique applied to long pages. A long page may refer to the longer of two allocation units in a file of a defined length.

In various embodiments, media file manager 208 may partition a virtual file into long pages, the length of which is determined when the file is created. The length can also be increased by allocating additional long pages that go beyond the original size of the file. A typical long page size might be 256 k bytes, for example. A given long page may be partitioned into a number of short pages, the length of which is also determined when the file is created. A typical short page size might be 4 k bytes, for example. All long pages should be partitioned in a consistent manner to ensure file integrity. New long pages are allocated at the end of the file. New short pages are allocated by first allocating a long page and then allocating short pages from it.

In general, page sizes may have various design constraints. For example, short and long page sizes (as expressed in bytes) are typically a power of two. In another example, long pages are generally longer than short pages. In yet another example, short pages are typically at least as long as a file header. In still another example, the overall file size is typically limited to 4,294,967,296 times the short page size (e.g., 16 terabytes if the short page size is 4 k bytes).

Pages are referenced by their index values into the file as expressed in short pages. Hence, the first short page in the file has the reference 0, as does the first long page in the file. The second short page in the file has the reference 1, while the second long page has a reference equal to the long page size divided by the short page size. For example, the second long page may have a reference value of 64 given the values in the previous scenario (e.g., 256 k/4 k=64).

In various embodiments, the first long page in the file is always partitioned into short pages. The first short page in the file typically contains only the file header. For example, media file manager 208 may store a file header for a virtual file in a first short page of the virtual file. The file header contains signatures and versions, page sizes, the page table for the root container and various fields concerning free space management in the file. Media file manager 208 may use two defined signature GUIDs. The first signature GUID indicates that the file complies with the format described herein. The second signature GUID is used by an application to indicate how the file is formatted at the next layer. Two version numbers are also defined for backward-compatible revisions of the format at both layers.

The root container is a short value containing the highest-level NVPs in the virtual file. A short value may comprise a page table of short pages. Some of the values of those NVPs may be containers themselves, so NVPs may form a hierarchy of arbitrary depth. An example of a file header may be illustrated as follows:

```
typedef struct SAL_FILE_HEADER {
    GUID        SALSignature;          // Identifies the format at this layer
    GUID        ApplicationSignature;  // Identifies the format at the next layer
    ULONG       SALVersion;            // The version of the format at this layer
    ULONG       ApplicationVersion;    // The version of the format at the next layer
    ULONG       ShortPageSize;         // Short page size in bytes.
    ULONG       LongPageSize;          // Long page size in bytes.
    ULONGLONG   RootContainerSize;     // Length of the root container in bytes.
    PageTable   RootContainer;         // A 'short' value containing NVPs
    ULONG       FreeShortPageCount;    // Number of pages in the FreeShortPages table
```

-continued

```
    ULONG       FreeLongPageCount;     // Number of pages in the FreeLongPages table
    PageTable   FreeShortPages;        // The table of recycled short pages
    PageTable   FreeLongPages;         // The table of recycled long pages
    PAGEREF     FirstFreeShortPage;    // The next short page to be allocated
    PAGEREF     FirstFreeLongPage;     // The next long page to be allocated
} SAL_FILE_HEADER
```

NVPs are stored in containers, either the root container or the value of some other NVP. They bind a GUID or text name to a binary value. NVPs are stored one after the other starting at the beginning of the container. In one embodiment, for example, they are padded to 64-bit boundaries. The end of the collection of NVPs in a container is indicated either by encountering the end of the container, or by an NVP with a label of GUID_NULL and a ValueSize of zero. An NVP can be effectively deleted by setting its label to GUID_NULL. Example type definitions for a NVP are shown as follows:

In some embodiments, the four highest bits of ValueSize may be used to provide information about a given NVP. For example, a NVP_FLAG_TEXT value indicates the NVP has a text name and that the header takes the form of a TextNvp-Header. A NVP_FLAG_CONTAINER value indicates that the NVP value contains more NVPs. A NVP_FLAG_SHORT value indicates the value is actually stored in a page table of short pages and that the value after the header is a PageTable structure. A NVP_FLAG_LONG indicates the value is actually stored in a page table of long pages and that the value after

```
typedef struct SAL_GUID_NVP_HEADER {
    GUID         Name;         // GUID_NULL indicates an unused NVP.
    ULONG        NvpSize;      // Nvp size
    ULONG        PrefixSize;   // prefix bytes
    ULONGLONG    ValueSize;    // unpadded size of value, top 4 bits stolen;
                               // does not include prefix bytes
                               // value or PageTable, padded to 64-bit boundary
} SAL_GUID_NVP_HEADER
typedef struct SAL_TEXT_NVP_HEADER {
    GUID         TextNvpGuid;  // Always TEXT_NVP_GUID
    ULONG        NvpSize ;     // Nvp size
    ULONG        PrefixSize ;  // prefix bytes
    ULONGLONG    ValueSize;    // unpadded size of value, top 4 bits stolen;
                               // does not include prefix bytes
    ULONG        NameSize;     // unpadded size of name (in WCHARs)
    ULONG        Reserved2 ;   // reserved (alignment)
                               // name, padded to 64-bit boundary with L'0' values
                               // value or PageTable, padded to 64-bit boundary
} SAL_TEXT_NVP_HEADER;
``` the header is a PageTable structure. An example of these definitions is shown as follows:

```
cpp_quote ("#define MAX_TEXT_NVP_NAME              MAX_PATH")
cpp_quote ("#define NVP_FLAG_TEXT                  0x1000000000000000L")
cpp_quote ("#define NVP_FLAG_CONTAINER             0x2000000000000000L")
cpp_quote ("#define NVP_FLAG_RESIDENT              0x4000000000000000L")
cpp_quote ("#define NVP_FLAG_SHORT                 0x8000000000000000L")
cpp_quote ("#define NVP_FLAG_RESERVED              0xc000000000000000L")
cpp_quote ("#define NVP_FLAG_MASK                  0xf000000000000000L")
cpp_quote ("#define NVP_VALUE_MASK                 (~NVP_FLAG_MASK)")
cpp_quote ("#define GET_VALUE_FROM_NVP_VALUESIZE_FIELD(valuefield)
    ((valuefield) & NVP_VALUE_MASK)")
cpp_quote ("#define GET_FLAGS_FROM_NVP_VALUESIZE_FIELD(valuefield)
    ((valuefield) & NVP_FLAG_MASK)")
cpp_quote ("#define FORM_NVP_VALUESIZE_FIELD(flags,value)
    (((flags) & NVP_FLAG_MASK) | ((value) & NVP_VALUE_MASK))")
cpp_quote ("#define FORM_NVP_VALUESIZE_FIELD_WITH_NEW_VALUE(valuefield,value)
    (FORM_NVP_VALUESIZE_FIELD(GET_FLAGS_FROM_NVP_VALUESIZE_FIELD(valuefield)
    ,(value)))")
cpp_quote ("#define FORM_NVP_VALUESIZE_FIELD_WITH_NEW_FLAGS(valuefieldflags)
    (FORM_NVP_VALUESIZE_FIELD((flags), GET_VALUE_FROM_NVP_VALUESIZE_FIELD(value
    field)))")
```

In some embodiments, the NVPs may be stored using a page table technique. A page table may comprise an array of long pages or short pages implemented using a tree of fixed-length arrays of page references, referred to as table pages as contained in short pages. The tree may be built, for example, having short pages referenced from a page table, table pages referenced from short pages, and data pages referenced from table pages.

Page tables take the form of a sparse array of data pages. Page tables of short pages are used to store "short" values. Page tables of long pages are used to store "long" values. In both cases, arrays are implemented as a hierarchy of fixed length tables in short pages. Each "table page" may comprise of page references, either to data pages or to other table pages. Some example page tables may be illustrated and described with reference to FIGS. 4-7.

Figure 4:
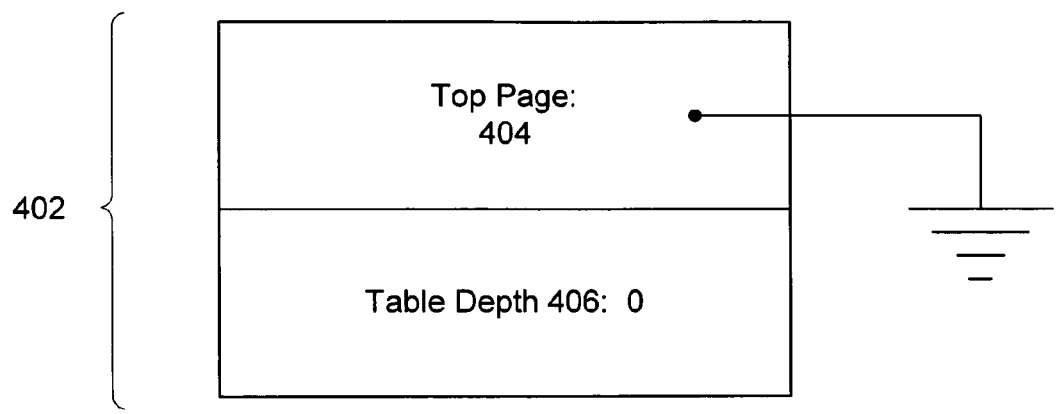
FIG. 4 illustrates an exemplary embodiment of a first page table.

FIG. 4 illustrates an exemplary embodiment of a first page table. FIG. 4 illustrates a page table 400. A root structure 402 for page table 400 may include a reference to the top page 404 and an integer table depth 406. An example of a type definition for a page table may be shown as follows:

```
typedef struct PageTable {
    PAGEREF TopPage;
    ULONG Depth;
} PageTable;
```

As shown in FIG. 4, page table 400 comprises a basic page table having a top page 404 with a null top page reference and a table depth 406 of 0. In this configuration, page table 400 represents a value consisting entirely of zeros. It is worthy to note that a page table typically has no length semantics. For example, page table 400 can represent a value consisting of any number of zeros.

Figure 5:
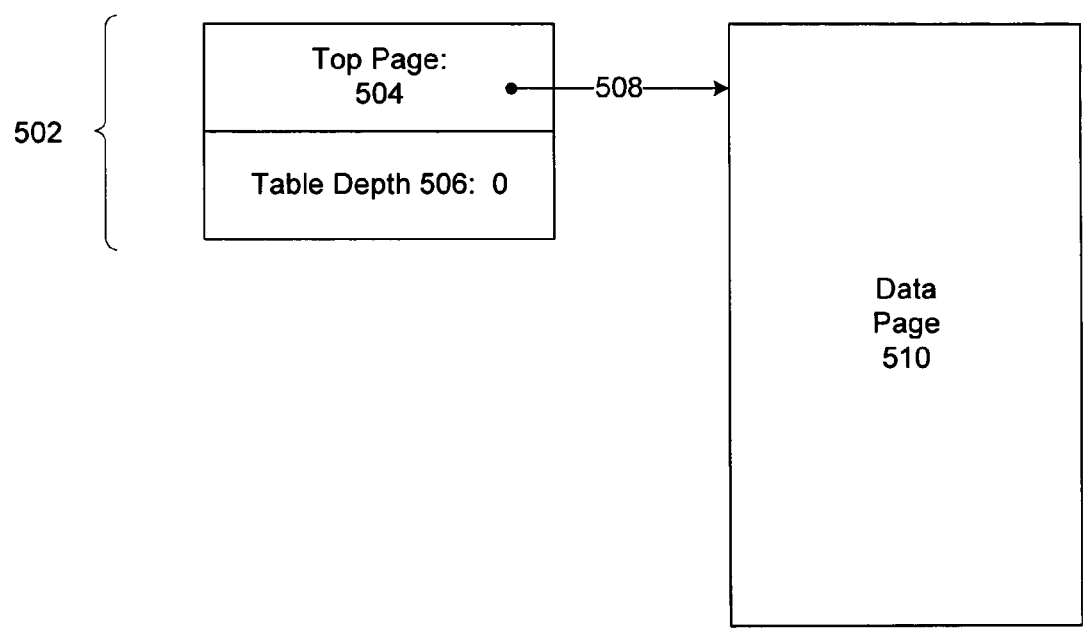
FIG. 5 illustrates an exemplary embodiment of a second page table.

FIG. 5 illustrates an exemplary embodiment of a second page table. FIG. 5 illustrates a page table 500. Page table 500 provides an example of a page table having a root structure 502 with a top page 504 referencing a single data page 510 as shown by arrow 508, and a table depth 506 of zero. The data in data page 510 is interpreted as occurring at an offset of 0 in the represented value.

Figure 6:
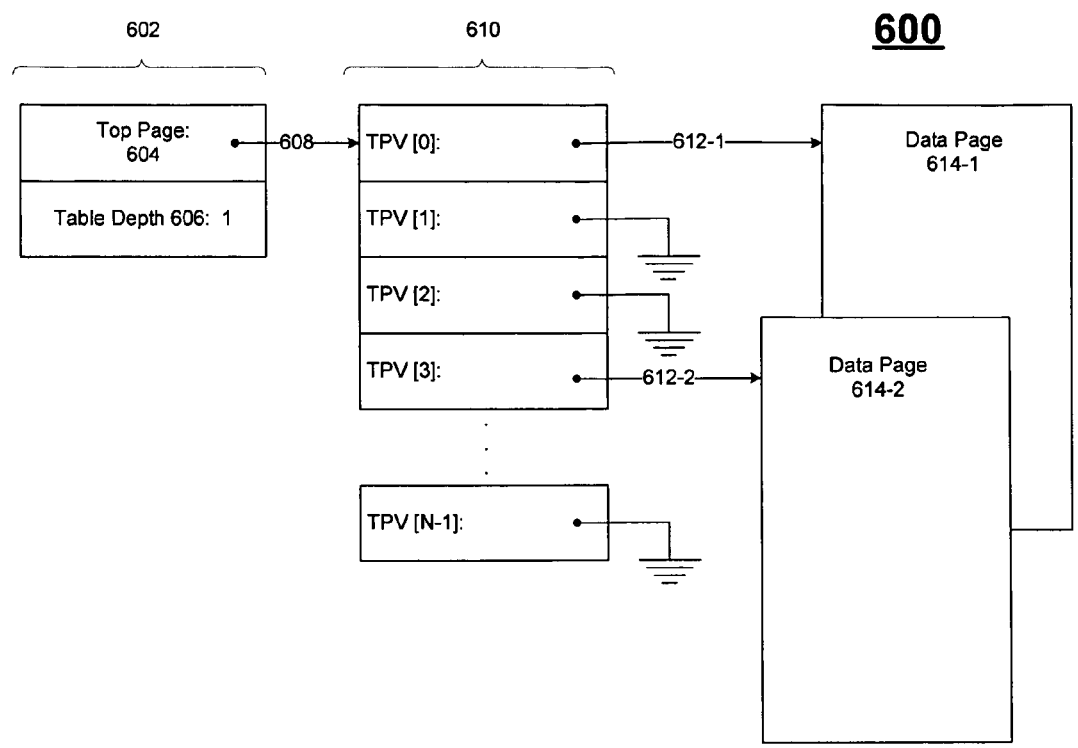
FIG. 6 illustrates an exemplary embodiment of a third page table.

FIG. 6 illustrates an exemplary embodiment of a third page table. FIG. 6 illustrates a page table 600. Page table 600 provides an example of a page table having a root structure 602 with a top page 604 referencing a single table page 610 as shown by arrow 608, and a table depth 606 of 1. At a table depth 606 of 1, table page 610 includes table page values (TPVs) of 0 to N−1 that may reference data pages or null references. As shown in FIG. 6, for example, page table 600 includes a TPV [0] with a reference 612-1 to a data page 614-1, and a TPV [3] with a reference 612-2 to a data page 614-2, with the remaining TPVs having null references.

Figure 7:
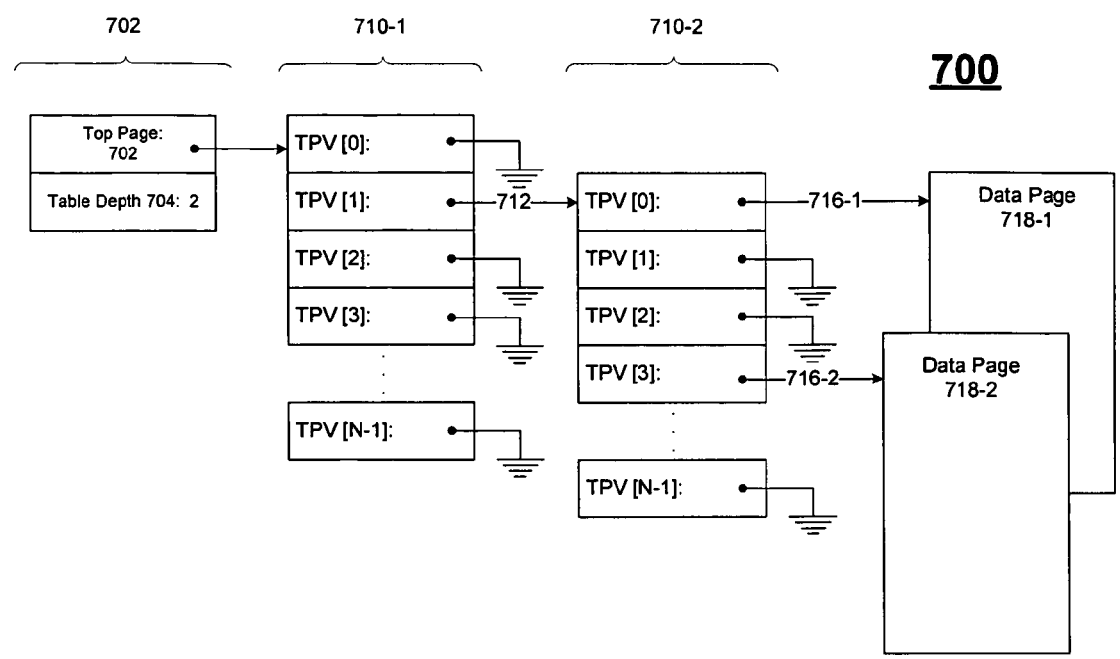
FIG. 7 illustrates an exemplary embodiment of a fourth page table.

FIG. 7 illustrates an exemplary embodiment of a fourth page table. FIG. 7 illustrates a page table 700. Page table 700 provides an example of a page table having a root structure 702 with a top page 704 referencing a first table page 710 as shown by arrow 708, and a table depth 706 of 2. At a table depth 706 of 2, first table page 710-1 includes TPVs of 0 to N−1 that may reference other table pages or null references. As shown in FIG. 7, for example, page table 700 includes a TPV [1] with a reference 712 to a second table page 710-2, with the remaining TPVs having null references. Second table page 710-2 may also include TPVs of 0 to N−1 that may reference data pages or null references. For example, second table page 710-2 may include a TPV [0] with a reference 716-1 to a data page 718-1, a TPV [3] with a reference 716-2 to a data page 718-2, with the remaining TPVs having null references. It may be appreciated that table pages 710-1, 710-2 may each have a table depth of 1. There are no defined limits to page table depth, but depths greater than 3 are atypical.

In various embodiments, media file manager 208 may manage free space for a virtual file using a first recycled page table and a second recycled page table. The recycled page tables may have a length deeper than zero (0), and have intermediate short pages that are not leaf nodes. Media file manager 208 manages free space in two similar but separate ways for short and long pages. There are two page tables of recycled pages, one for short pages and one for long pages. A first recycled page table may be referred to as Header.FreeShortPages, for example. The first recycled page table Header.FreeShortPages is always fully populated from index 0 to index Header.FreeShortPageCount. A second recycled page table may be referred to as Header.FreeLongPages, for example. The second recycled page table Header.FreeLongPages is always fully populated from index 0 to index Header.FreeLongPageCount. Recycled pages are added and removed at the end of the arrays.

In some cases, a queue rather than a stack may be desired, particularly for free long pages. This is to prevent a reverse correlation between time and file position in some scenarios. Short pages used for short values might also benefit from being managed in a queue, though short pages used for other purposes may be kept in a stack. Page tables may be used to implement queues using two indices. This approach, however, will have a tendency to create unnecessarily deep page tables over long periods of time, such as if a file is used for days to implement a circular buffer. The depth should not become too large, although eliminating top pages that contain only one non-null reference and adjusting the indices as required would manage this scenario.

Header.NextShortPage and Header.NextLongPage may be used to indicate where fresh pages should be allocated. Short pages are allocated from Header.NextShortPage until Header.NextShortPage reaches a long page boundary. When this occurs, a new long page should be allocated, and short pages may be allocated from the new allocated long page. Long pages may be allocated from Header.NextLongPage. This is just the end of the file. In some cases, it may be desirable to coalesce free short pages into a free long page, which may be useful as a compaction tool.

In some embodiments, media file manager 208 may be arranged to write state information to a recovery log while building a virtual file in order to recover the virtual file in case of failure conditions, such as a power disruptions or system failures. The recovery log is written into long pages after the end of the virtual file (e.g., at Header.NextLongPage) as established in the current snapshot. A long page in the recovery log consists of a header in the first short page, a trailer in the last short page, and short data pages starting with the second short page. The recovery log should be managed to ensure it does not collide with unrecoverable writes to the virtual file. An example of a recover log header and recovery log trailer may be shown as follows:

```
typedef struct RecoveryLogHeader {
    GUID        Signature;         // Identifies a recovery log header
    ULONG       SequenceNumber;
    ULONG       ShortPageCount;    // Number of short pages in the page array
    ULONG       LongPageCount;     // Number of long pages in the page array
    BOOLEAN     Last;              // Indicates this is the last long page in the log
    PAGEREF     PageRefs[ ];       // A reference for each page in the array
} RecoveryLogHeader;
typedef struct RecoveryLogTrailer {
    GUID        Signature;         // Identifies a recovery log trailer
    ULONG       SequenceNumber;    // Must match the header's sequence number
} RecoveryLogTrailer;
```

For some page size combinations, the RecoveryLogHeader as described above might exceed the length of a short page. The probability for this scenario may be reduced or entirely prevented by, for example, disallowing such cases by constraining page sizes, using more than one short page for the recovery log header, and/or restricting the number of short pages per long page used for the log.

In some embodiments, media file manager 208 may implement various cache techniques to enhance performance. Media file manager 208 may partition a virtual file into one or more long pages and short pages, write a portion of the long pages and short pages to a cache, and access the cached pages with multiple threads from multiple processes. In one embodiment, for example, the cache is shared between processes using named shared memory. Cached pages may be assigned one of four states: (1) Clean; (2) Dirty; (3) Snapshot; and (4) Snapshot ghost. In addition, some pages are recoverable while others are not depending on which part of the file they come from. For example, all long pages are typically unrecoverable. Short pages are typically recoverable unless there are scenarios in which short pages will be written at high frequency and recovery is not required for them.

For all pages, initial states for the pages may be defined in accordance with three rules: (1) all pages read from disk start out clean; (2) all newly-created pages start out dirty; and (3) clean pages that are locked for write, not written to, and then unlocked, are left clean. The commit to disk procedure occurs concurrently with client read/write activity. Unrecoverable pages may be committed at a higher frequency than recoverable pages, but unrecoverable pages should be committed whenever recoverable pages are committed.

A process for committing unrecoverable pages may be accomplished as follows. For example, all (unrecoverable) dirty pages become snapshot. Snapshot pages are treated like clean pages except that when they are written to, a copy is made, the copy is dirty and the original is snapshot ghost. Snapshot and snapshot ghost pages are written to their respective places in the file. Snapshot ghost pages are flushed. Snapshot pages become clean.

A process for committing all pages may be accomplished as follows. All dirty pages become snapshot. Snapshot pages are treated like clean pages except that when they are written to, a copy is made, the copy is dirty and the original is snapshot ghost. The dirty copies are exposed out of the cache for IOs rather than their snapshot ghost versions. Unrecoverable snapshot and unrecoverable snapshot ghost pages are written to their respective places in the file. Recoverable snapshot and recoverable snapshot ghost pages are written to the recovery log. Recoverable snapshot and recoverable snapshot ghost pages are written to their respective places in the file. Snapshot ghost pages are flushed. Snapshot pages become clean.

In some embodiments, media file manager 208 may implement various concurrency rules to prevent collisions. Media file manager 208 may partition a virtual file into multiple resources each having a lock, and read media information from the virtual file by multiple applications using the resource locks. The concurrency rules implemented in the allocation layer are intended to achieve the highest degree of independence between the various file readers, file writers and disk input/output (I/O). The cache may be used to communicate between readers and writers, and also to isolate readers and writers from disk I/O.

A virtual file may be partitioned into various "file resources." For example, file resources may include: (1) a header; (2) short page allocation; (3) long page allocation; (4) root container expansion; (5) root container access; (6) value expansion (e.g., per value); and (7) value access (e.g., per value). Each resource may have its own lock. Most locks are taken and released in a single call to the allocation layer. The exception is "value access" and "value expansion." The allocation layer API should allow the application to lock these resources explicitly across many calls to the allocation layer. Various dependency rules may be established to determine what resources may be locked by a given consumer when other resources are locked. These rules prevent cycles that would otherwise deadlock the allocation layer.

Most resources can be locked in one of three ways: (1) read lock; (2) write lock. The locking rules are as follows: (1) any number of readers can share a resource with zero writers; and (2) a write lock is exclusive of all other locks.

In some cases, locks are taken by the block layer code for short intervals to assure coherency of NVPs, page tables, allocation tables, and so forth. In other cases, locks are taken over intervals determined by calls to the block layer API under the control of the application. It is worthy to note that the application also knows the semantics of the NVP values, and may lock the NVP value across multiple read/writes in order to preserve the semantic integrity.

Read locks are taken by readers over intervals during which coherency of the resource in question must be maintained in order for a series of correlated read operations to succeed. No reads are attempted without taking a read lock. Write locks are taken by writers over intervals in which a series of correlated write operations are to occur to maintain the coherency of a resource. No writes are attempted without taking a write lock.

In order to allow readers to read from a file resource while a writer is writing to that same file resource, writers keep a set of private dirty pages while they have a given resource locked. Readers do not see these dirty pages until the writer commits them in the process of releasing the write lock. Only a single writer is allowed at one time in the absence of a general way to merge the dirty pages produced concurrently by two writers. Commit locks may be reduced or eliminated if the dirty pages are versioned.

To assure coherency across multiple file resources, the allocation layer should guarantee to readers that committed changes will never go out to the disk out of order. When writes are committed, events may need to be thrown so that readers can be informed of value changes.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a machine-readable storage medium containing instructions that if executed enable a system to:
   receive multiple media streams of media information;
   partition a virtual file into one or more long pages of a first defined length;
   partition a long page into one or more short pages of a second defined length;
   reference short pages by a reference value representing an offset value within a long page;
   reference long pages by a reference value representing an offset value comprising said first defined length divided by said second defined length; and
   store said multiple media streams in said single virtual file using a hierarchy of name-value pairs, said hierarchy formed by storing multiple name-value pairs in one or more containers within said pages, said containers comprising a root container storing one or more high-level name-value pairs for said virtual file at a high level of said hierarchy,
   wherein at least one high-level name-value pair stored in said root container comprises a value representing a page table structure implemented as an array of long pages or short pages storing one or more values of said name-value pairs at a lower level of said hierarchy.

2. The article of claim 1, further comprising instructions that if executed enable the system to store a file header for said virtual file in a first short page of said virtual file.

3. The article of claim 1, further comprising instructions that if executed enable the system to bind a name representing a globally unique identifier or text string to a value representing a resident value, a short value, or a long value, to form each name-value pair.

4. The article of claim 1, further comprising instructions that if executed enable the system to reference a short page from a page table, reference a table page from said short page, and reference a data page from said table page.

5. The article of claim 1, further comprising instructions that if executed enable the system to manage free space for said virtual file using a first recycled page table and a second recycled page table for an array of short pages and long pages, respectively.

6. The article of claim 1, further comprising instructions that if executed enable the system to write state information to a recovery log to recover said virtual file.

7. The article of claim 1, further comprising instructions that if executed enable the system to partition said virtual file into one or more long pages and short pages, write a portion of said long pages and short pages to a cache, and access said cached pages with multiple threads.

8. The article of claim 1, further comprising instructions that if executed enable the system to partition said virtual file into multiple resources each having a lock, and read media information from said virtual file by multiple applications using said resource locks.

9. An apparatus comprising a media processing sub-system having a processor, a memory, and a communications interface, said memory storing a media file manager for execution by said processor, said communications interface to receive multiple media streams of media information, said media file manager to: store partition a virtual file into one or more long pages of a first defined length, said multiple media streams in said virtual file using a hierarchy of name-value pairs, partition a long page into one or more short pages of a second defined length, reference short pages by a reference value representing a sequential offset value said hierarchy formed by storing multiple name-value pairs within a long page, in one or more containers within said pages, said containers comprising a root reference long pages by a reference value representing a sequential offset value container storing one or more high-level name-value pairs for said virtual file at comprising said first defined length divided by said second defined length, and a high level of said hierarchy, wherein at least one high-level name-value pair stored in said root container comprises a value representing a page table structure implemented as an array of long pages or short pages storing one or more values of said name-value pairs at a lower level of said hierarchy.

10. The apparatus of claim 9, comprising multiple media readers to read media information for said different media streams from said virtual file.

11. The apparatus of claim 9, comprising a storage device coupled to said processor, said storage device having machine-readable media, said media file manager to store media information for said media streams to said virtual file using non-contiguous portions of said machine-readable media.

12. The apparatus of claim 9, said virtual file comprising a page table, said page table comprising an array of long pages and short pages, said short pages to reference one or more table pages, and said table pages to reference one or more data pages.

13. The apparatus of claim 9, said virtual file comprising a first recycled page for said short pages and a second recycled page for said long pages, said recycled pages to indicate free storage space for said virtual file.

14. A method, comprising:
    receiving multiple media streams of media information at a computing device comprising a processor and a memory;
    partitioning a virtual file into one or more long pages of a first defined length;
    partitioning a long page into one or more short pages of a second defined length;
    referencing short pages by a reference value representing an offset value within a long page;
    referencing long pages by a reference value representing an offset value comprising said first defined length divided by said second defined length; and
    storing said multiple media streams in said virtual file using a hierarchy of name-value pairs, said hierarchy formed by storing multiple name-value pairs in one or more containers within said pages, said containers comprising a root container storing one or more high-level name-value pairs for said virtual file at a high level of said hierarchy, wherein at least high-level name-value pair stored in said root container comprises a value representing a page table structure implemented as an array of long pages or short pages storing one or more values of said name-value pairs at a lower level of said hierarchy.

15. The method of claim 14, comprising storing a file header for said virtual file in a first short page of said virtual file.

16. The method of claim 14, comprising binding a name representing a globally unique identifier or text string to a value representing a resident value, a short value, or a long value, to form each name-value pair.

17. The method of claim 14, comprising:
    referencing a short page from a page table;
    referencing a table page from said short page; and
    referencing a data page from said table page.

* * * * *